United States Patent
Wu et al.

(10) Patent No.: US 9,748,990 B2
(45) Date of Patent: Aug. 29, 2017

(54) SYSTEM AND METHOD FOR TRAINING SIGNALS FOR FULL-DUPLEX COMMUNICATIONS SYSTEMS

(71) Applicant: Huawei Technologies Co., Ltd., Shenzhen (CN)

(72) Inventors: Huan Wu, Kanata (CA); Eddy Shi-Ning Hum, Ottawa (CA)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 14/617,598

(22) Filed: Feb. 9, 2015

(65) Prior Publication Data
US 2016/0233903 A1   Aug. 11, 2016

(51) Int. Cl.
| | |
|---|---|
| H04B 7/005 | (2006.01) |
| H04B 1/12 | (2006.01) |
| H04L 5/14 | (2006.01) |
| H04J 13/00 | (2011.01) |
| H04L 29/06 | (2006.01) |

(52) U.S. Cl.
CPC ............ H04B 1/12 (2013.01); H04J 13/0062 (2013.01); H04L 5/1461 (2013.01); H04L 69/14 (2013.01); H04L 69/22 (2013.01)

(58) Field of Classification Search
CPC ............................ H04B 7/15585; H04B 15/00
See application file for complete search history.

(56) References Cited

U.S. PATENT DOCUMENTS

| | | | | |
|---|---|---|---|---|
| 8,085,864 | B2 * | 12/2011 | Ponnampalam | H04B 7/02 375/267 |
| 2006/0109938 | A1 * | 5/2006 | Challa | H04L 25/03006 375/347 |
| 2008/0101507 | A1 * | 5/2008 | Oketani | H04L 27/2613 375/343 |
| 2008/0137562 | A1 | 6/2008 | Li et al. | |

(Continued)

FOREIGN PATENT DOCUMENTS

| | | |
|---|---|---|
| CN | 101123449 A | 2/2008 |
| CN | 103516638 A | 1/2014 |

(Continued)

OTHER PUBLICATIONS

IEEE( Interference—Avoidance Pilot Design using ZcZ sequences for multi cell MIMO-OFDM Systems; Rongqing Zhang, 2012).*

(Continued)

*Primary Examiner* — Maharishi Khirodhar
(74) *Attorney, Agent, or Firm* — Slater Matsil, LLP

(57) ABSTRACT

A method includes transmitting a training signal derived from a sequence, the training signal facilitates an estimation of a channel impulse response (CIR) for a communications channel between a transmit antenna of the device and a receive antenna of the device, estimating the CIR for the communications channel, and receiving signals corresponding to a first transmission at the receive antenna. The method also includes cancelling self-interference present in the received signals in accordance with the estimated CIR, the self-interference arising from a second transmission made by the transmit antenna of the device, thereby producing an interference canceled received signal, and processing the interference canceled received signal.

27 Claims, 14 Drawing Sheets

(56) References Cited

U.S. PATENT DOCUMENTS

| | | |
|---|---|---|
| 2009/0147706 A1 | 6/2009 | Yu et al. |
| 2009/0268645 A1 | 10/2009 | Chindapol et al. |
| 2010/0226290 A1 | 9/2010 | Kwak et al. |
| 2011/0317597 A1* | 12/2011 | Wan ............... H04W 72/1289 370/281 |
| 2012/0063369 A1 | 3/2012 | Lin et al. |
| 2012/0201153 A1 | 8/2012 | Bharadia et al. |
| 2013/0102254 A1 | 4/2013 | Cyzs et al. |
| 2013/0230001 A1* | 9/2013 | Kimura ............. H04W 72/0406 370/329 |
| 2013/0286903 A1 | 10/2013 | Khojastepour et al. |
| 2013/0301484 A1 | 11/2013 | Khandani |
| 2014/0233407 A1 | 8/2014 | Pourahmadi et al. |
| 2014/0348032 A1 | 11/2014 | Hua et al. |
| 2015/0103802 A1 | 4/2015 | Cheng et al. |
| 2015/0303984 A1* | 10/2015 | Braithwaite ........... H04B 1/525 455/78 |
| 2015/0318976 A1 | 11/2015 | Eltawil et al. |
| 2015/0341157 A1* | 11/2015 | Eltawil ................ H04L 5/1453 370/278 |
| 2016/0050062 A1 | 2/2016 | Moher et al. |
| 2016/0056946 A1* | 2/2016 | Moher ..................... H04L 5/14 370/277 |
| 2016/0056988 A1* | 2/2016 | Cheng ................ H04L 27/261 375/267 |
| 2016/0081091 A1 | 3/2016 | Kim et al. |
| 2016/0127114 A1 | 5/2016 | Kim et al. |
| 2016/0226653 A1 | 8/2016 | Bharadia et al. |
| 2016/0337108 A1 | 11/2016 | Choi et al. |
| 2016/0345315 A1 | 11/2016 | Noh et al. |
| 2017/0019218 A1 | 1/2017 | Sadeghi et al. |

FOREIGN PATENT DOCUMENTS

| | | |
|---|---|---|
| WO | 2014027231 A1 | 2/2014 |
| WO | 2014130112 A1 | 8/2014 |
| WO | 2014208953 A1 | 12/2014 |

OTHER PUBLICATIONS

Suk-Hoon Noh (The graduate school Yonsei University, department of electrical and Electronics Engineering, Jul. 2005).*

IEEE(Multicode MIMO systems with quanternary LCZ and ZCZ sequences, Jul. 2008, vol. 57 of IEEE Transactions on vehicular Technology).*

"3rd Generation Partnership Project; Technical Specification Group GSM/EDGE Radio Access Network; Solutions for Voice services over Adaptive Multi-user channels on One Slot (VAMOS) enhancements (Release 12)", 3GPP TR 13.801, V12.0.0, Technical Report, May 2014, 23 pp.

Oyernide, et al., "Subspace Tracking-Based Decision Directed CIR Estimator and Adaptive CIR Prediction", IEEE Transactions on Vehicular Technology, vol. 61, No. 5, Jun. 2012, pp. 2097-2107.

Bharadia, D., et al. "Full Duplex MIMO Radios," web.stanford.edu/~skatti/pubs/nsdi14-mimo.pdf., downloaded Feb. 9, 2015, 13 pages.

Chu, D., "Polyphase Codes With Good Periodic Correlation Properties," IEEE Transactions on Information Theory, Jul. 1972, pp. 531-532.

"LTE; Evolved Universal Terrestrial Radio Access (E-UTRA); Physical channels and modulation (3GPP TS 36.211 version 11.5.0 Release 11)" ETSI TS 136 211 V11.5.0., Technical Specification, LTE, Jan. 2014, 122 pages.

Fan, P.Z., et al., "Class of binary sequences with zero correlation zone," Electronics Letters, vol. 35, No. 10, May 13, 1999, pp. 777-779.

Liu, Y., et al., "New Constructions of Zero-Correlation Zone Sequences," IEEE Transactions on Information Theory, vol. 59, No. 8, Aug. 2013, pp. 4994-5007.

Popovic, B.M., "Efficient DFT of Zadoff-Chu sequences," Electronics Letters, vol. 46, No. 7, Apr. 1, 2010, 2 pages.

Duarte, M., et al., "Design and Characterization of a Full-Duplex Multiantenna System for WiFi Networks," IEEE Transactions on Vehicular Technology, vol. 63, No. 3, Mar. 2014, pp. 1160-1177.

* cited by examiner

SYSTEM AND METHOD FOR TRAINING SIGNALS FOR FULL-DUPLEX COMMUNICATIONS SYSTEMS

This application is related to the following co-assigned patent application Ser. No. 14/617,679, filed Feb. 9, 2015, entitled "System and Method for Full-Duplex Operation in a Wireless Communications System," which application is hereby incorporated herein by reference.

TECHNICAL FIELD

The present disclosure relates generally to digital communications, and more particularly to a system and method for training signals for full-duplex communications systems and use thereof.

BACKGROUND

Full-duplex is being considered as a radio access technology for Fifth Generation (5G) and beyond wireless communication systems. In full-duplex operation, a device simultaneously transmits and receives on the same channel. A significant challenge in a full-duplex communications system is interference at a device's receiver(s), where the interference comes directly from a transmitter(s) of the device. Such interference may be referred to as self-interference. As an example, for a Third Generation Partnership Project (3GPP) Long Term Evolution (LTE) base station transceiver, the self-interference may be as much as 120 dB higher than the sensitivity level of the receiver(s) of the 3GPP LTE base station transceiver.

Therefore, there is a need for training signals (or similarly, pilot signals) to help facilitate channel impulse response (CIR) estimation to enable interference cancellation in received signals, as well as systems and methods for utilizing the training signals.

SUMMARY OF THE DISCLOSURE

Example embodiments of the present disclosure which provide a system and method for training signals for full-duplex communications systems and use thereof.

In accordance with an example embodiment of the present disclosure, a method for operating a device configured to operate in a full-duplex mode is provided. The method includes transmitting, by the device, a training signal derived from a sequence, the training signal configured to facilitate an estimation of a channel impulse response (CIR) for a communications channel between a transmit antenna of the device and a receive antenna of the device, and estimating, by the device, the CIR for the communications channel. The method also includes receiving, by the device, signals corresponding to a first transmission at the receive antenna, cancelling, by the device, self-interference present in the received signals in accordance with the estimated CIR, the self-interference arising from a second transmission made by the transmit antenna of the device, thereby producing an interference canceled received signal, and processing, by the device, the interference canceled received signal.

In accordance with another example embodiment of the present disclosure, a device configured for full-duplex operation is provided. The device includes a transmitter, a processor operatively coupled to the transmitter, and a receiver operatively coupled to the processor. The transmitter transmits a training signal derived from a sequence, the training signal configured to facilitate an estimation of a channel impulse response (CIR) for a communications channel between a transmit antenna of the device and a receive antenna of the device. The processor estimates the CIR for the communications channel, cancels self-interference present in received signals in accordance with the estimated CIR, the received signals corresponding to a first transmission at the receive antenna, the self-interference arising from a second transmission made by the transmit antenna of the device, thereby producing an interference canceled received signal, and processes the interference canceled received signal. The receiver receives the signals.

In accordance with another example embodiment of the present disclosure, a communications system is provided. The communications system includes a plurality of user equipments, and a full-duplex device operatively coupled to the plurality of user equipments. The full-duplex device includes a processor, and a non-transitory computer readable storage medium storing programming for execution by the processor, The programming including instructions to transmit a training signal derived from a sequence, the training signal configured to facilitate an estimation of a channel impulse response (CIR) for a communications channel between a transmit antenna of the device and a receive antenna of the device, estimate the CIR for the communications channel, receive signals corresponding to a first transmission at the receive antenna, cancelling self-interference present in the received signals in accordance with the estimated CIR, the self-interference arising from a second transmission made by the transmit antenna of the device, thereby producing an interference canceled received signal, and processing the interference canceled received signal.

Advantageous features of embodiments of the example embodiments may include method for transmitting a training signal. The method includes generating, by a device configured to operate in a full-duplex mode, a plurality of training sequences from a set of sequences, the plurality of training sequences generated in accordance with a communications system requirement; mapping, by the device, a first training sequence to a transmit antenna; multiplexing, by the device, the mapped training sequence with data symbols thereby producing a transmission stream; and transmitting, by the device, the transmission stream.

The method could further include, wherein each sequence in the set of sequences has a correlation matrix that is a scaled identity matrix. The method could further include, wherein transmitting the transmission stream comprises filtering the transmission stream. The method could further include, wherein the communications system requirement comprises at least one of: a length of the sequence is equal to a desired symbol length N before cyclic prefix being added, where N is an integer value; a size of the set of sequences is at least equal to a number of transmit antennas of the device $N_b$; and a sequence zone length is at least equal to a channel delay spread $L_b$ which dictates a minimum sequence zone length for auto-correlations and cross-correlations of sequences in the set of sequences. The method could further include, further comprising appending a cyclic prefix to the mapped training sequence prior to multiplexing.

One advantage of an embodiment is that the use of ZCZ sequences to generate training sequences allows for improved CIR estimation accuracy, as well as improved cancellation performance.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to training signals (or pilot signals) for full-duplex communications systems and use thereof. For example, a full duplex device transmits a training signal derived from a zero-correlation-zone (ZCZ) sequence configured to facilitate an estimation of a channel impulse response (CIR) for a communications channel between a transmit antenna of the device and a receive antenna of the device, estimates the CIR for the communications channel, and receives signals corresponding to a first transmission at the receive antenna. The full-duplex device also cancels self-interference present in the received signals in accordance with the estimated CIR and known transmitted symbols, the self-interference arising from a second transmission made by the transmit antenna of the device, thereby producing an interference canceled received signal, and processes the interference canceled received signal.

The present disclosure will be described with respect to example embodiments in a specific context, namely Third Generation Partnership Project (3GPP) Long Term Evolution (LTE) TDD compliant communications systems that support full-duplex operations. The disclosure may be applied to standards compliant communications systems, such as those that are compliant with 3GPP LTE frequency division duplexed (FDD), IEEE 802.11, and the like, technical standards, and non-standards compliant communications systems, that support full-duplex operations.

Figure 1:
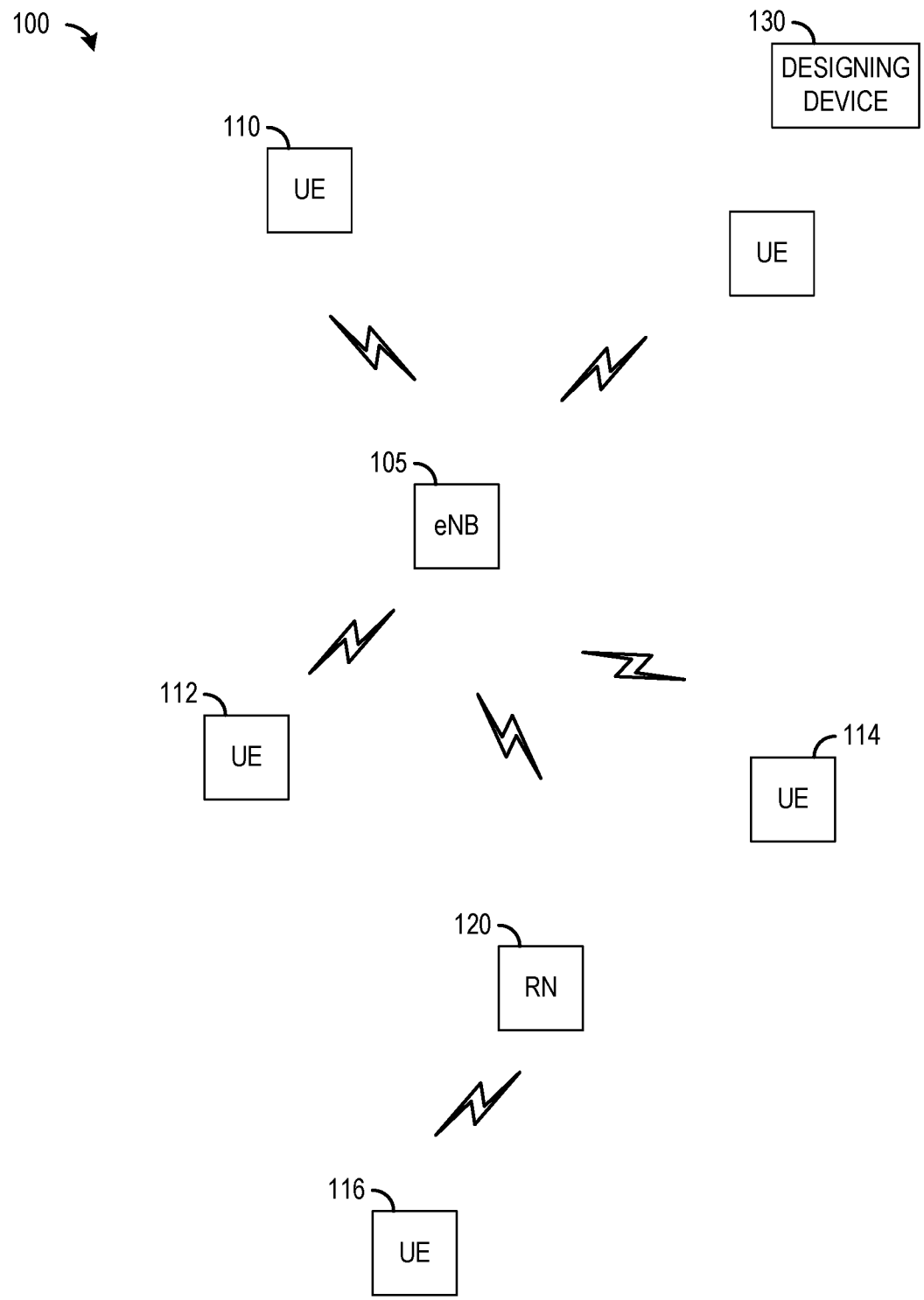
FIG. 1 illustrates an example communications system according to example embodiments described herein.

FIG. 1 illustrates an example communications system 100. Communications system 100 includes an eNB 105. eNB 105 may serve user equipment (UE), such as UE 110, UE 112, and UE 114. In general, eNB 105 may operate as an intermediary for the UEs, receiving transmissions to and from the UEs and then forwarding the transmissions to their intended destination. Communications system 100 may also include a relay node (RN) 120 that uses some bandwidth donated by eNB 105 to serve UEs, such as UE 116. RN 120 may help to improve coverage, data rate, as well as overall communications system performance, by utilizing some network resources donated by eNB 105. eNBs may also be commonly referred to as base stations, NodeBs, controllers, access points, base station transceiver, and the like, while UEs may also be commonly referred to as stations, mobiles, mobile stations, terminals, users, subscribers, and the like. Communications system 100 may also include a designing device 130. Designing device 130 may be configured to design and/or select training signals used in full-duplex operation. Training signals may also be commonly referred to as pilot signals. Training signals and pilot signals may be used interchangeably herein without loss of generality. Designing device 130 may design and/or select training signals for communications system 100. Alternatively, designing device 130 may design and/or select training signals for a portion of communications system 100 and communications system 100 may include a plurality of designing devices. Designing device 130 may be a standalone entity as shown in FIG. 1. Alternatively, designing device 130 may be co-located with another network entity, such as an eNB.

While it is understood that communications systems may employ multiple eNBs capable of communicating with a number of UEs, only one eNB, one RN, one designing device, and a number of UEs are illustrated for simplicity.

A half-duplex device is capable of only transmitting or receiving at any given time, frequency, and/or spatiality that it is allowed to communicate. In general, half-duplex devices do not have to worry about self-interference. In other words, since receivers of a half-duplex device are not being used at the same time, frequency, and/or spatiality as transmitters of the half-duplex device, the receivers do not have to worry about interference caused by the transmitters. A full-duplex device is capable of transmitting and receiving at the same given time, frequency, and/or spatiality, which may be simply referred to as a channel, over which it is allowed to communicate. Full-duplex devices may have built-in mechanisms to compensate for the self-interference. A full-duplex device may also operate as a half-duplex device.

Figure 2:
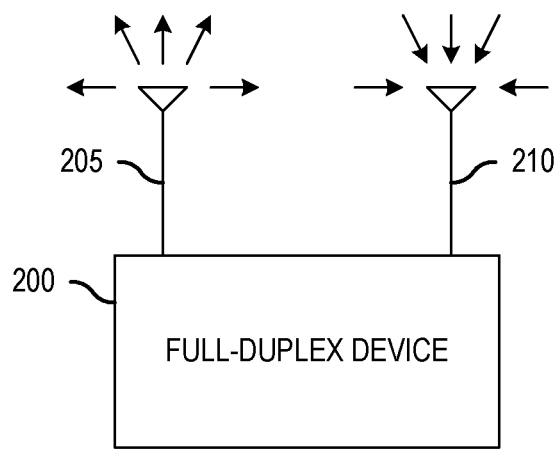
FIG. 2 illustrates an example full-duplex device according to example embodiments described herein.

FIG. 2 illustrates an example full-duplex device 200. Full-duplex device 200 may be an eNB capable of full-duplex operation. Full-duplex device 200 may also be a UE capable of full-duplex operation. Full-duplex device 200 may include one or more transmit antenna 205 and one or more receive antenna 210. Since in most implementations, transmit antenna 205 are relatively close to or collocated (shared) with receive antenna 210, signals transmitted using transmit antenna 205 may appear at receive antenna 210 at significantly higher power levels than transmissions made by remotely located devices that are transmitting to full-duplex device 200. Although full-duplex device 200 is shown in FIG. 2 as having collocated transmit antenna 205 and receive antenna 210, alternative implementations of full-duplex device 200 may have collocated or remotely located transmit antenna 205 and/or receive antenna 210. As an illustrative example, an alternate full-duplex device may include multiple remote antennas serving as transmit antennas and/or receive antennas. Therefore, the illustration of full-duplex device 200 having collocated antennas should not be construed as being limiting to either the scope or the spirit of the example embodiments.

As discussed previously, self-interference has been a considerable hindrance in the development of full-duplex communications systems. Generally, self-interference cancellation in a receiver includes channel estimation during a training period where training signals (or pilot signals) are transmitted to facilitate channel estimation, e.g., multiple input multiple output (MIMO) channel estimation, CIR estimation, and the like, and production of a replica of the self-interference based on the known transmitting data symbols and the channel estimation.

Figure 3:
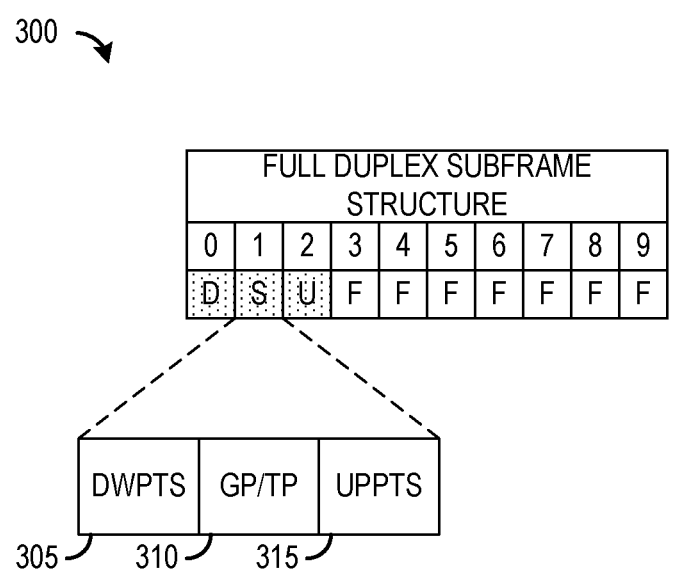
FIG. 3 illustrates an example full-duplex subframe structure according to example embodiments described herein.

In order to support legacy devices, e.g., half-duplex devices, existing half-duplex frame structures may be modified to support full-duplex communications, including the transmission of training signals (or pilot signals) to facilitate channel estimation. As an illustrative example, Third Generation Partnership Project (3GPP) Long Term Evolution (LTE) TDD frame structures may be modified to support full-duplex communications. FIG. 3 illustrates an example full-duplex subframe structure 300. Full-duplex subframe structure 300 is based on subframe configuration 3 of a 3GPP LTE TDD compliant communications system. Subframes 0 and 2 of full-duplex subframe structure 300 may be used for downlink transmissions and uplink transmissions, respectively. Subframe 1 of full-duplex subframe structure 300 may be a special subframe including a downlink (a DwPTS) portion 305, a guard period/training period (GP/TP) 310, and an uplink (UpPTS) portion 315. GP/TP 310 may serve several purposes. When full-duplex subframe structure 300 is used in conjunction with a legacy (half-duplex) eNB, for example, GP/TP 310 may serve as a GP between DwPTS portion 305 and UpPTS portion 315 for the switching from downlink transmission to uplink transmission. However, when full-duplex subframe structure 300 is used in conjunction with a full-duplex eNB, for example, GP/TP 310 may also be used to allow full-duplex devices to perform CIR estimation in accordance with a training signal (or pilot signal) transmitted in half-duplex GP/TP 310. The length of GP/TP 310 may be adjusted using special subframe configurations.

Remaining subframes of full-duplex subframe structure 300 may be utilized in a flexible (F) manner, meaning that each subframe may be used for downlink transmissions and/or uplink transmissions. In other words, one or more uplink transmissions and/or one or more downlink transmissions may be scheduled for each subframe. The scheduling for the subframes that may be used in a flexible manner may be optimized based on a number of criterion (criteria), such as maximum capacity, interference constraints, and the like.

From a UE's perspective, the UE may need to be able to prepare an uplink transmission or a downlink reception based on scheduling assignments received on a control channel or higher layer signaling (such as radio resource control (RRC) signaling).

Figure 4:
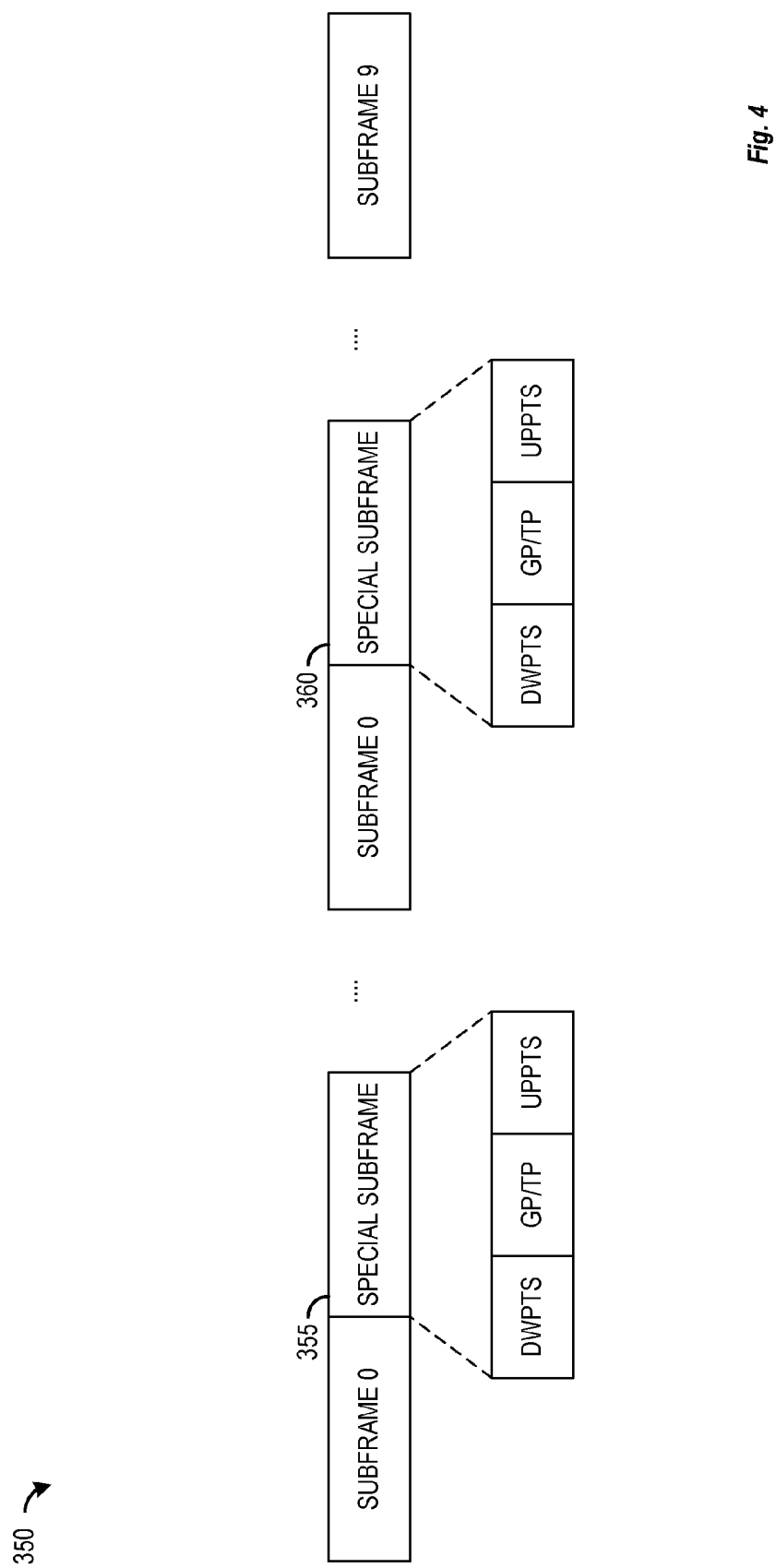
FIG. 4 illustrates an example sequence of subframes of a frame for a communications system supporting full-duplex operation according to example embodiments described herein.

FIG. 4 illustrates an example sequence of subframes of a frame 350 for a communications system supporting full-duplex operation. Frame 350 may be representative of frames for a communications system supporting full-duplex operation utilizing extensions to 3GPP LTE TDD compliant communications system utilizing configurations 0, 1, 2, and 6. Frame 350 includes a first special subframe 355 comprising a DwPTS portion, a GP/TP portion, and an UpPTS portion. Frame 350 also includes a second special subframe 360. For communications system supporting full-duplex operation utilizing extensions to 3GPP LTE TDD compliant communications system utilizing configurations 3, 4, and 5, a representative frame may be similar, but with an exception that there is only a single special subframe per frame. The length, as well as periodicity, of the training period may be dependent upon environmental and/or communications system factors. As an illustrative example, a signal to noise ratio (SNR) requirement of a channel estimator at a receiver may need to be met and may play a role in determining the length and/or periodicity of the training period. Another factor that may play a role in determining the length and/or periodicity of the training period may be a requirement that the repetition of the training is less than the time coherence of the channel, for example. A detailed discussion presenting frame structures supporting full-duplex operation is presented in co-assigned patent application entitled "System and Method for Full-Duplex Transmission in a Wireless Communications System".

Figure 5:
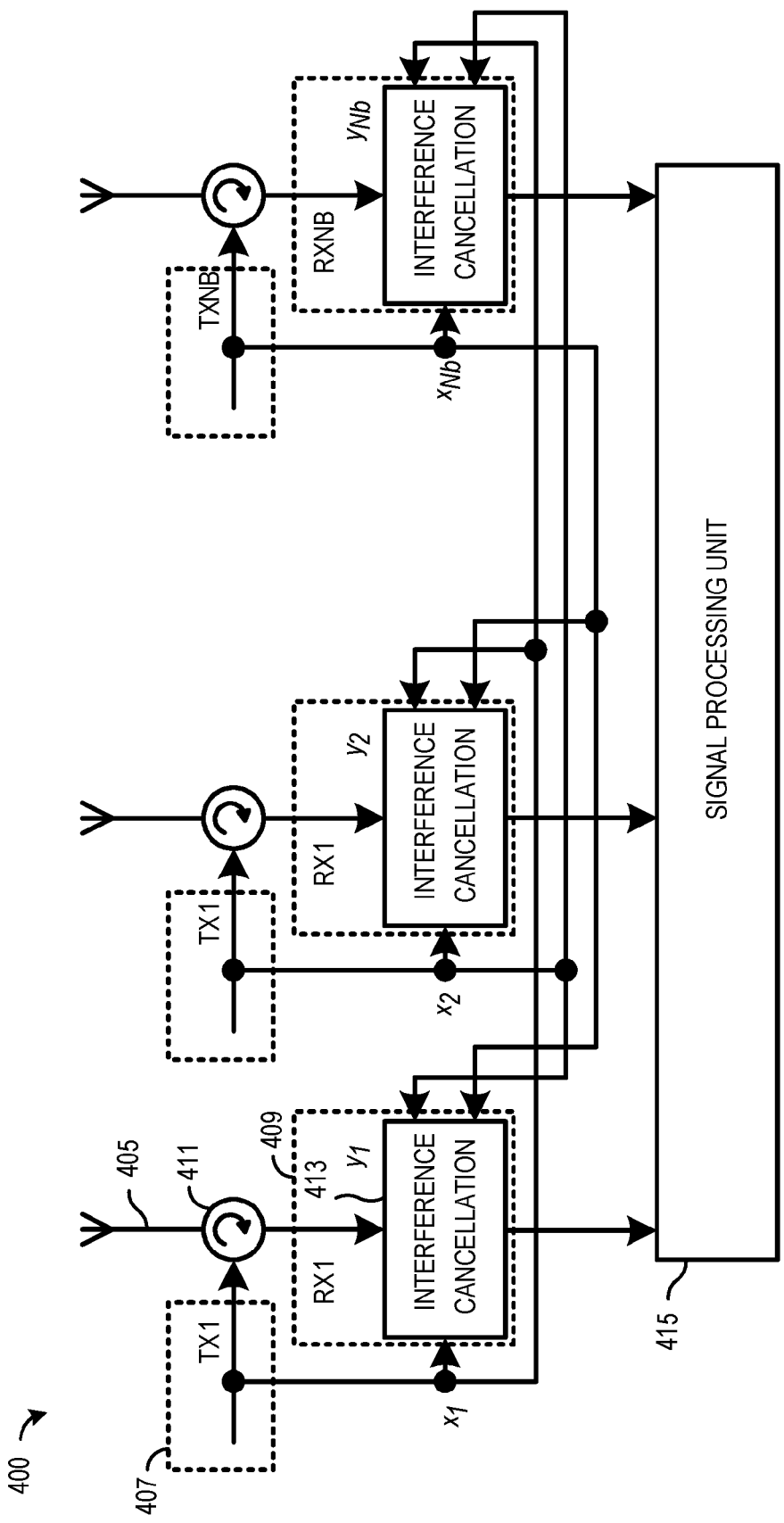
FIG. 5 illustrates an example full-duplex device according to example embodiments described herein.

FIG. 5 illustrates an example full-duplex device 400. Full-duplex device 400 includes antennas, including antenna 405, shared by transmitters, including transmitter "TX 1" 407, and receivers, including receiver "RX 1" 409. Full-duplex device 400 also includes circulators, including circulator 411, which couples antennas, such as antenna 405, to associated transmitters (e.g., transmitter 407) and receivers (e.g., receiver 409). The self-interference at a receiver may arise from different paths (commonly referred to as multi-path). As an illustrative example, a transmitted signal may leak through the circulator and be reflected by the antenna to the receiver. Furthermore, other transmitted signals from collocated antennas may be detected by the receiver together with reflections of the transmitted signals off surrounding structures. In order to effectively remove the self-interference in a receiver, channel estimates (e.g., MIMO channel estimates, CIRs, and the like) from the transmitters to the receiver have to be accurately estimated so that a replica of the self-interference may be reproduced and used to cancel the self-interference at the receiver, for example, at interference cancellation unit 413. The received signals, after interference cancellation, may be processed to produce information by signal processing unit 415.

Figure 6:
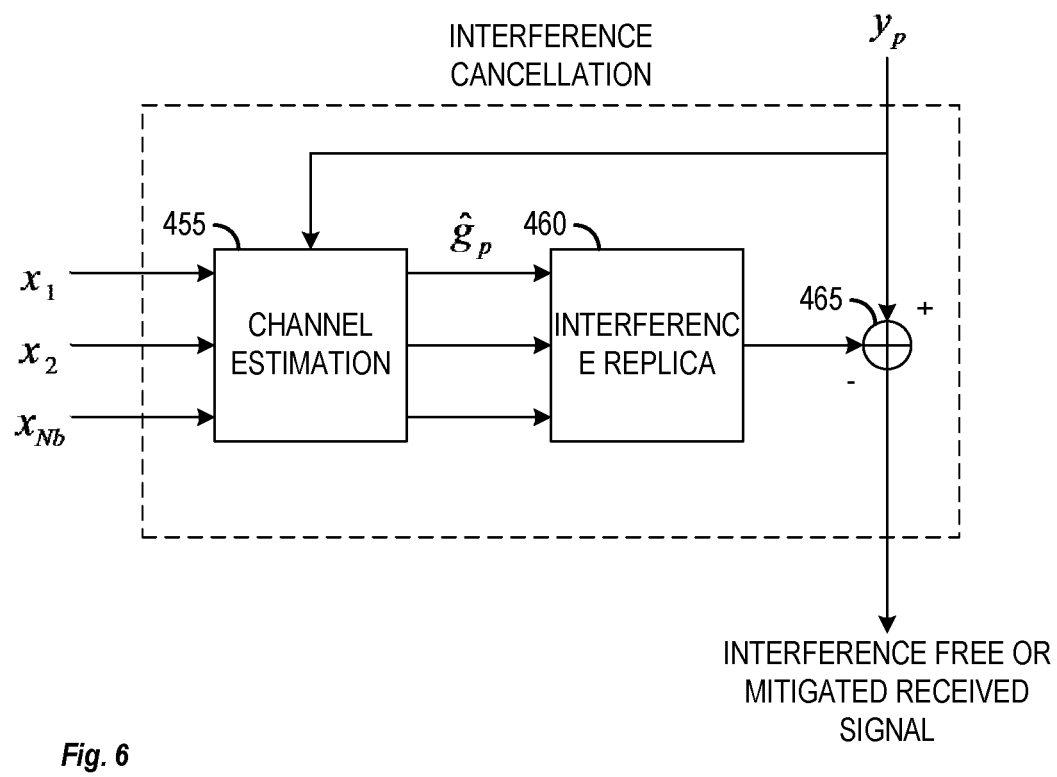
FIG. 6 illustrates an example interference cancellation unit according to example embodiments described herein.

FIG. 6 illustrates an example interference cancellation unit 450. Interference cancellation unit 450 may be an example implementation of an interference cancellation unit of full-duplex device 400 of FIG. 5. Interference cancellation unit 450 may operate in a multi-phase mode. In a first phase, interference cancellation unit 450 may perform channel estimation, such as CIR estimation, MIMO channel estimation, and the like, using a channel estimation unit 455. Channel estimation may be performed utilizing training signals (or pilot signals) (e.g., $x_1, x_2, \ldots, x_{Nb}$) transmitted to facilitate channel estimation. As an illustrative example, referring back to FIGS. 3 and 4, the training signals may be transmitted in half-duplex GP/TP portions of special subframes. In a second phase, an interference replica generating unit 460 of interference cancellation unit 450 may generate a replica of the self-interference based on known transmitted data symbols (e.g., $x_1, x_2, \ldots, x_{Nb}$) and the channel estimate (e.g., $\hat{g}_p$) produced by channel estimation unit 455. A combiner 465 may combine (i.e., subtract) the interference replica (as generated by interference replica generating unit 460) with the received signal (e.g., $y_p$) to produce an interference free or mitigated version of the received signal.

For discussion purposes, consider a general MIMO communications system with $N_b$ transmit antennas and $M_b$ receive antennas, as well as $L_b$ taps representing the channel delay spread from a transmitter to a receiver, and the training signals are transmitted in half-duplex mode, i.e., only training signals are transmitted in a training period where no transmission is permitted from the other end of the communications. It is assumed that the CIRs between any transmitter and receiver pair have the same length (i.e., $L_b$) since the antennas are usually collocated or co-located. However, the example embodiments presented herein are capable of operating CIRs with different channel delay spreads. The baseband representation of samples at a p-th receiver may be expressed as $$y_p(n) = \sum_{q=1}^{N_b} \sum_{l=0}^{L_b-1} g_{p,q}(l) x_q(n-l) + v_p(n), \quad p=1,2,\ldots,M_b, \quad (1)$$

where $x_q(\cdot)$ are the training symbols of the training signal transmitted from q-th antenna, $g_{p,q}(\cdot)$ are the taps of the CIR from the q-th transmit antenna to the p-th receive antenna, and $v_p(\cdot)$ are the AWGN at the receiver. It is noted that the desired signal is not present in Equation (1) because of the half-duplex assumption for the training signals transmitted in the training period. For a block of N samples, n=k, k+1, ..., k+N−1, it is convenient to collect them in a vector and extend Equation (1) to a matrix form, which may be expressed as $$y_p = X g_p + v_p, \quad (2)$$

where $$y_p = [y_p(k), y_p(k+1), \ldots, y_p(k+N-1)]^T, \quad (3)$$

and $$v_p = [v_p(k), v(k+1), \ldots, v_p(k+N-1)]^T, \quad (4)$$

are both N×1 vectors, with T denoting a matrix transpose, and $g_p$ is an $N_b L_b \times 1$ vector representing the collective CIRs from all transmit antennas to the p-th receive antenna. In other words $$g_p = \begin{bmatrix} g_{p,1}(0) \ldots g_{p,1}(L_b-1), g_{p,2}(0) \ldots g_{p,2}(L_b-1), \ldots, \\ g_{p,N_b}(0) \ldots g_{p,N_b}(L_b-1) \end{bmatrix}^T. \quad (5)$$

The training symbols from all transmit antennas may be stacked in an $N \times N_b L_b$ matrix X, which may have the form $$X = [X_1, X_2, \ldots, X_{N_b}], \quad (6)$$

where $X_q$ is an $N \times L_b$ channel convolution matrix with symbols from the q-th transmit antenna expressible as $$X_q = \begin{bmatrix} x_q(k) & x_q(k-1) & \ldots & x_q(k+1-L_b) \\ x_q(k+1) & x_q(k) & \ldots & x_q(k+2-L_b) \\ \ldots & \ldots & \ldots & \ldots \\ x_q(k+N-1) & x_q(k+N-2) & \ldots & x_q(k+N-L_b) \end{bmatrix}. \quad (7)$$

An estimator of the CIRs $g_p$ in Equation (2) that reaches the Cramer-Rao Lower Bound (CRLB) may be a least-square (LS) estimator provided that X is known and $v_p$ is a white Gaussian noise vector, which is expressible as $$\hat{g}_p = (X^H X)^{-1} X^H y_p, \quad p=1,2,\ldots,M_b, \quad (8)$$

where H denotes matrix conjugate transpose. A replica of the self-interference may then be generated as $$\hat{y}_p = X \hat{g}_p. \quad (9)$$

The cancellation residual may be expressed as $$\epsilon_p = \hat{y}_p - y_p. \quad (10)$$

The LS channel estimator requires a matrix inversion of a correlation matrix associated with the transmitted data symbols, which is expressible as $$R_x = X^H X, \quad (11)$$

with dimensions, $N_b L_b \times N_b L_b$, that grow linearly with the number of transmit antennas and the number of channel taps, which makes it difficult to calculate the matrix inversion in real-time for a typical MIMO system (e.g., 3GPP LTE) where $N_b$ ranges from 2 to 8, and $L_b$ ranges from 20 and up.

It is noted that it is possible to calculate the matrix inversion a priori and store $R_x^{-1}$ for subsequent use. However, this solution may require a lot of memory. A typical FD system may need multi-stages of cancellations and the number of channel taps required for each stage may be different. Therefore it may be necessary to store multiple versions of $R_x^{-1}$, each with different dimensions. Furthermore, pre-calculating the matrix inversion restricts the adaptability of the channel estimator by preventing it from being able to dynamically adjust the number of taps to best match the multipath environment.

Furthermore, calculating the matrix inversion (either a priori or in real-time) has the numerical instability associated with the increase in dimension. For discussion purposes, consider an example of a 2×2 MIMO LTE system ($N_b = M_b = 2$) with 20 MHz bandwidth, N=2048 and the cyclic prefix length $N_{cp} = 512$. A Rayleigh multipath situation with $L_b = 40$ is modeled and one orthogonal frequency division multiplexed (OFDM) symbol with random 64-QAM data is used for the training signal. Table 1 illustrates the numerical instability inherent in matrix inversion. Table 1 presents condition number of the correlation matrix of the training signal in accordance with an example embodiment, the channel estimation error of the LS estimator based on the training signal, and residual mean square error (MSE) for random OFDM symbols. With the random OFDM symbol, the condition number of $R_x$ can be as high as $1.37 \times 10^{17}$, indicating that $R_x$ is close to singular and $R_x^{-1}$ would be numerically unstable even though the inversion was calculated using singular value decomposition (SVD) based pseudo-inversion. The numerical instability is translated into larger channel estimation errors and higher cancellation residuals, which are shown in Table 1.

TABLE 1

Numerical Instability Inherent in Matrix Inversion.

| Pilots Type | $R_x$ condition number | max $|\hat{g} - g|$ | Residual MSE |
|---|---|---|---|
| Random OFDM Symbol | $1.37 \times 10^{17}$ | 0.47 | $5.15 \times 10^{-4}$ |
| ZCZ Sequence | 1 | $4.79 \times 10^{-14}$ | $6.28 \times 10^{-26}$ |

Figure 7:
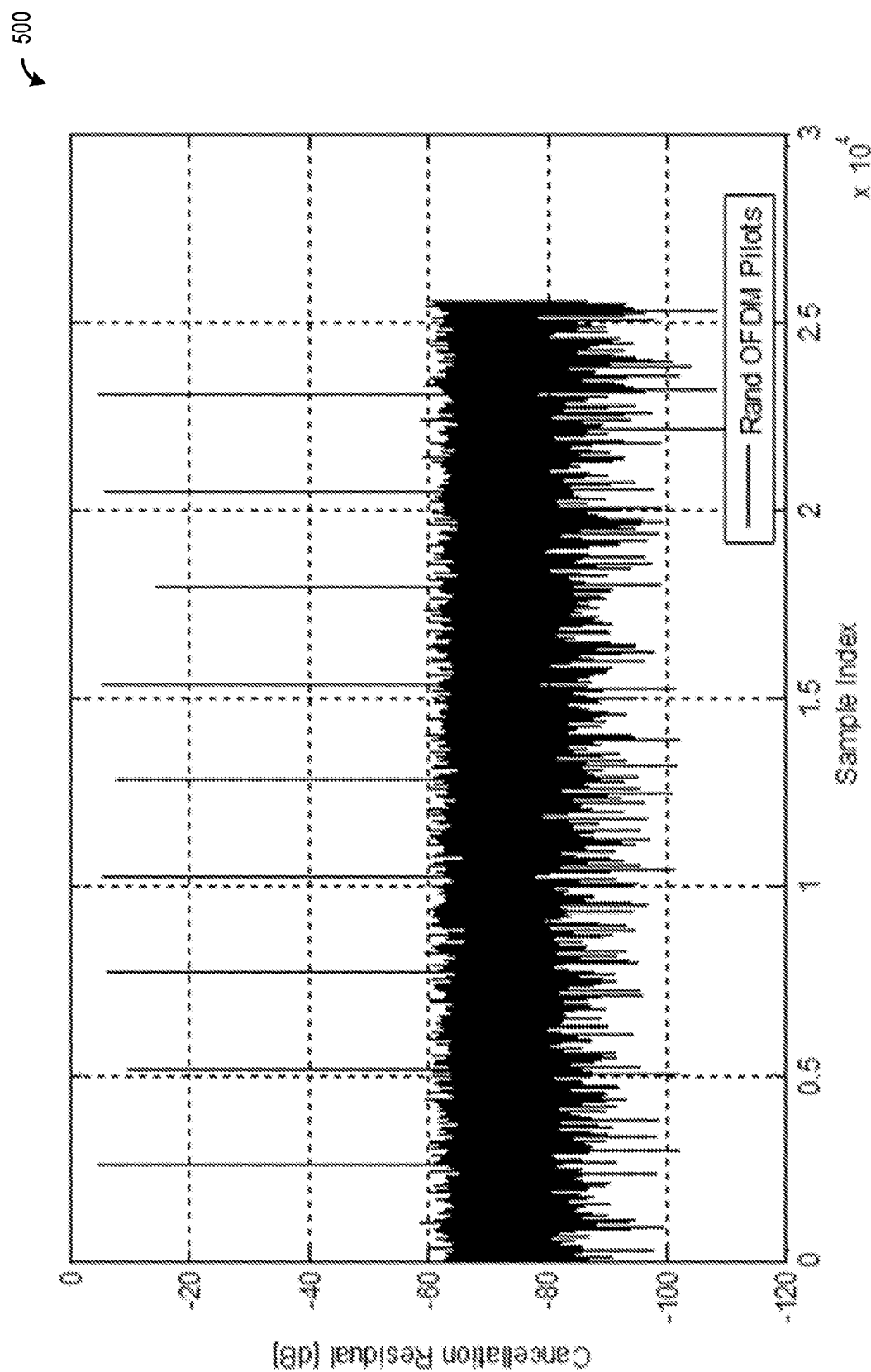
FIG. 7 illustrates a data plot of example cancelation residuals for different sample index according to example embodiments described herein.

In addition, numerical instability may also generate data dependency with channel estimates, which may introduce discontinuities between OFDM symbols in the replica of the self-interference (as produced by Equation (9)) outside of the training period. The discontinuity may manifest as spikes in between OFDM symbols in the cancelation residual (as produced by Equation (10)). FIG. 7 illustrates a data plot 500 of example cancelation residuals for different sample index. Data plot 500 is generated from data derived from the 2×2 MIMO LTE system as described above.

According to an example embodiment, a signal with a correlation matrix that is an identity matrix or a scaled identity matrix is selected as the training signal (or pilot signal) for the full-duplex communications system. In other words, $$R_x \equiv N\sigma_x^2 I_{N_b L_b}, \quad (12)$$

where $\sigma_x^2 = |x_q(n)|^2$. The LS estimator may then be expressible as $$\hat{g}_p = \frac{1}{N\sigma_x^2} X^H y_p, \quad (13)$$
$$p = 1, 2, \ldots, M_b,$$

which are cross-correlations between the training signals and received samples and the matrix inversion would be completely obliterated. A rearrangement of Equation (13) based on Equations (5) and (6) may be performed to make the channel estimator more flexible, the estimator may then be expressed as $$\begin{bmatrix} \hat{g}_{p,1} \\ \hat{g}_{p,2} \\ \vdots \\ \hat{g}_{p,N_b} \end{bmatrix} = \frac{1}{N\sigma_x^2} \begin{bmatrix} X_1^H \\ X_2^H \\ \vdots \\ X_{N_b}^H \end{bmatrix} y_p, \quad (14)$$

$$p = 1, 2, \ldots, M_b,$$

where $$\hat{g}_{p,q} = [\hat{g}_{p,q}(0), \hat{g}_{p,q}(1) \ldots \hat{g}_{p,q}(L_b-1)]^T,$$
$$p=1,2,\ldots,M_b, q=1,2,\ldots,N_b. \quad (15)$$

Equation (15) may imply that individual CIR of any of the transmitter and receiver pairs may be estimated separately and independently. In other words $$\hat{g}_{p,q} = \frac{1}{N\sigma_x^2} X_q^H y_p, \quad (15)$$
$$p = 1, 2, \ldots, M_b,$$
$$q = 1, 2, \ldots, N_b.$$

A benefit of the above observation is that the individual CIR may have a different length, $L_{p,q}$ instead of an equal length of $L_b$ (which can be redefined as the maximum channel length of all individual ones, for example). Another benefit is that the individual channel estimators may be computed in parallel if multiple computing engines are available.

In order to derive a more realizable sufficient condition than Equation (12) leading to the solution (Equation (13)) and provide guidance to the design of the training signals, Equation (11) is expanded with respect to Equation (6), expressible as $$R_x = X^H X = \begin{bmatrix} X_1^H X_1 & X_1^H X_2 & \ldots & X_1^H X_{N_b} \\ X_2^H X_1 & X_2^H X_2 & \ldots & X_2^H X_{N_b} \\ \vdots & \vdots & \ddots & \vdots \\ X_{N_b}^H X_1 & X_{N_b}^H X_2 & \ldots & X_{N_b}^H X_{N_b} \end{bmatrix}. \quad (17)$$

Each of the sub-block matrices in Equation (17) may be further expanded using Equation (7), expressible as $$\begin{bmatrix} r_{q_1,q_2}(k,k) & r_{q_1,q_2}(k,k-1) & \ldots & r_{q_1,q_2}(k,k-L_b+1) \\ r_{q_1,q_2}(k-1,k) & r_{q_1,q_2}(k-1,k-1) & \ldots & r_{q_1,q_2}(k-1,k-L_b+1) \\ \vdots & \vdots & \ddots & \vdots \\ r_{q_1,q_2}(k-L_b+1,k) & r_{q_1,q_2}(k-L_b+1,k-1) & \ldots & r_{q_1,q_2}(k-L_b+1,k-L_b+1) \end{bmatrix}, \quad (18)$$

where $$r_{q_1,q_2}(k_1,k_2) = \sum_{n=0}^{N-1} x^*_{q_1}(n+k_1) x_{q_2}(n+k_2), \quad q_1, q_2 \in \{1,2,\ldots,N_b\} \quad (19)$$

and $$k_1, k_2 \in \{k, k-1, \ldots, k-L_b+1\}, \text{ or } |k_1 - k_2| \in \{0, 1, \ldots, L_b-1\}. \quad (20)$$

Assume that a cyclic prefix of the last $N_{cp}$ ($N_{cp} > L_b$) samples in each of the training signals is appended before transmitting. Then the correlation of Equation (19) becomes a periodic correlation within the zone of $L_b$ lags of Equation (20), with $n+k_1$ and $n+k_2$ being mod of N. The proposition of Equation (12) becomes true if $$r_q(k_1, k_2) = r_{q,q}(k_1, k_2) = \begin{cases} N\sigma_x^2, & k_1 = k_2 \\ 0, & \text{otherwise} \end{cases}, \quad (21)$$

$$q \in \{1, 2, \ldots, N_b\}$$

and $$r_{q_1,q_2}(k_1,k_2) = 0, q_1 \neq q_2 \text{ and } q_1, q_2 \in \{1,2,\ldots,N_b\} \quad (22)$$

for any $k_1$ and $k_2$ in the zone of Equation (20). The sufficient conditions of Equations (21) and (22) within the zone of Equation (20) are the definitions of the zero-correlation-zone (ZCZ) sequences.

According to an example embodiment, a ZCZ sequence is used as training sequences in full-duplex communications systems. In general, any of the ZCZ sequences, such as the binary and polyphase ZCZ sequences, may be used as the training signals for each of the transmit antennas in a MIMO full-duplex communications system, so long as the parameters of the ZCZ sequences set satisfy the requirements of the communications system. Examples of the requirements may include: the length of the ZCZ sequence being equal to the desired symbol length N (before cyclic prefix being added); the size of the ZCZ sequences set being equal to or greater than the number of transmit antennas $N_b$; and the ZCZ zone length being equal to or greater than the channel delay spread $L_b$ which may dictate a minimum ZCZ-zone length for auto- and cross-correlations of the sequences in the ZCZ sequence set; and the like. Due to the wide availability and the large degrees of freedom in the design of ZCZ sequences, the example embodiments can be tailored to almost any communications system (e.g., OFDM and/or OFDMA, Single Carrier and CDMA systems, and the like).

It is understood that training signals based on a ZCZ sequence set is just one example of realizing the sufficient condition expressed in Equation (12). Other types of sequences may be used as training signals so long as the condition expressed in Equation (12) is satisfied.

Figure 8:
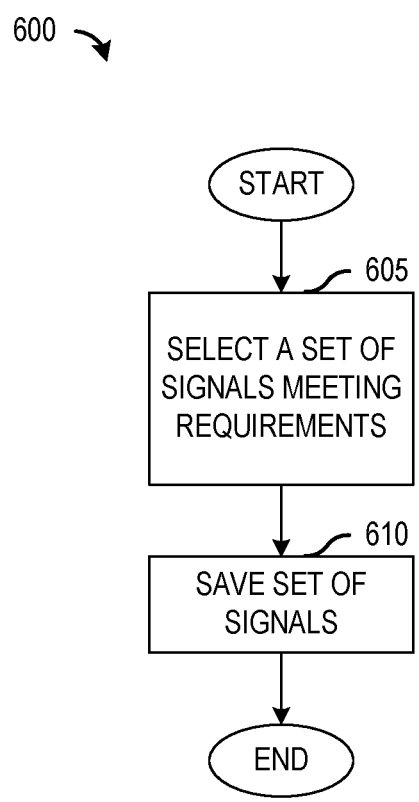
FIG. 8 illustrates a flow diagram of example operations occurring in a selection of training signals for a full-duplex communications system according to example embodiments described herein.

FIG. 8 illustrates a flow diagram of example operations 600 occurring in a selection of training signals for a full-duplex communications system. Operations 600 may be indicative of operations occurring in a device, such as a full-duplex device such as a full-duplex eNB and/or a full-duplex UE, or a designing device, such as designing device 130, as the device selects training signals for a full-duplex communications system.

Operations 600 may begin with the device selecting a set of signals that meet communications system requirements (block 605). The set of signals may meet the condition as expressed in Equation 12, as well as in Equations (21) and (22). As an example, ZCZ signals may be used and the set of ZCZ signals selected may meet conditions as set in Equations (12), (21), and (22). The set of ZCZ signals selected may also meet communications system requirements, such as the length of the ZCZ sequence being equal to the desired symbol length N (before cyclic prefix being added); the size of the ZCZ sequences set being equal to or greater than the number of transmit antennas $N_b$; and the ZCZ zone length being equal to or greater than the channel delay spread $L_b$ which may dictate a minimum ZCZ-zone length for auto- and cross-correlations of the sequences in the ZCZ sequence set; and the like. The device may save the set of ZCZ signals (block 610). The set of ZCZ signals (or information about the set of ZCZ signals, which may be sufficient to generate a duplicate of the set of ZCZ signals) may be saved to a local memory, a remote memory, a local database, a remote database, a local server, a remote server, and the like.

Figure 9:
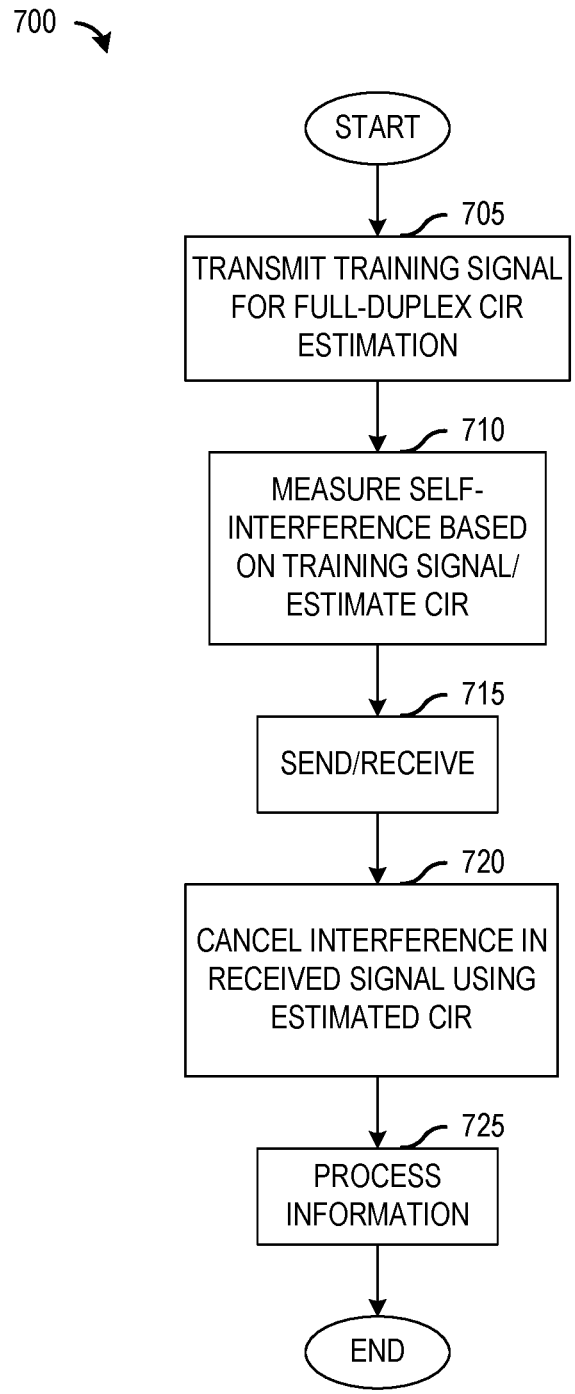
FIG. 9 illustrates a flow diagram of example operations occurring at a device operating in full-duplex mode according to example embodiments described herein.

FIG. 9 illustrates a flow diagram of example operations 700 occurring at a device operating in full-duplex mode. Operations 700 may be indicative of operations occurring at a device, such as an eNB capable of full-duplex operation or a full-duplex UE, as the device operates in full-duplex mode.

Operations 700 may begin with the device transmitting a training signal for full-duplex CIR estimation (block 705). The training signals may be a ZCZ signal or any other type of signal satisfying Equation (12) selected for meeting communications system requirements. The training signals may be selected by the device, a designing device, a technical standard, an operator of the communications system, and the like. The device may measure self-interference in accordance with the training signal, as well as estimate CIR (block 710). The device may send and/or receive (block 715). The device may cancel interference present in the received signals by using the estimated CIR (block 720).

The device may process information contained in the received signals after the interference cancellation (block 725).

Figure 10:
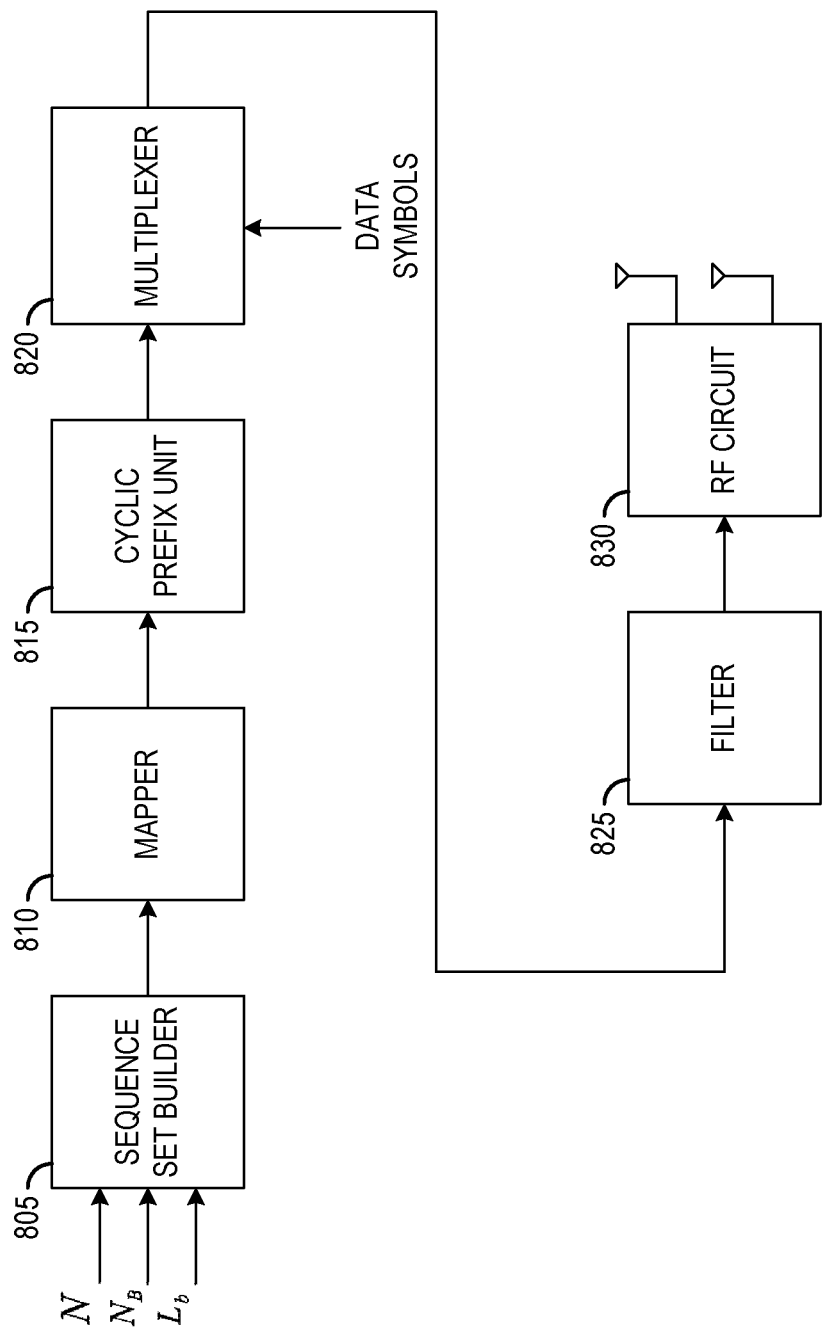
FIG. 10 illustrates a diagram of an example data path for transmitting a training signal according to example embodiments described herein.

FIG. 10 illustrates a diagram 800 of an example data path for transmitting a training signal. Diagram 800 may be representative of a data path for transmitting a training signal comprising a ZCZ sequence or any other type of signal satisfying Equation (12) selected meeting communications system requirements, the training signal used to facilitate CIR estimation of a full-duplex channel. Diagram 800 may include a sequence set builder 805, a mapper 810, a cyclic prefix unit 815 if necessary or required by the type of training signals, a multiplexer 820, a filter 825, and radio frequency (RF) circuit 830. Sequence set builder 805 is configured to generate a sequence set, e.g., a training signal sequence set, from a ZCZ signal. Sequence set builder 805 is configured to have as input the communications system requirements, including: the length of the ZCZ sequence being equal to the desired symbol length N (before cyclic prefix being added); the size of the ZCZ sequences set being equal to or greater than the number of transmit antennas $N_b$; and the ZCZ zone length being equal to or greater than the channel delay spread $L_b$ which may dictate a minimum ZCZ-zone length for auto- and cross-correlations of the sequences in the ZCZ sequence set; and the like, and to generate the sequence set in accordance with the communications system requirements.

The sequence set may be provided to mapper 810, which is configured to map the sequence to transmit antenna ports. Mapper 810 may select a sequence from the sequence set for each of the transmit antennas. In general, a sequence selected for a transmit antenna is unique and is not reused for other transmit antennas. In a situation where the sequence set is larger than the number of transmit antennas, the unselected sequences may be assigned to neighboring cells to help mitigate co-channel interference. Cyclic prefix unit 815 is configured to add a cyclic prefix to the selected sequences, producing extended sequences. The cyclic prefix used may be of length $N_{cp}$, where $N_{cp} \geq L_b$. The extended sequences may be multiplexed by multiplexer 820. Multiplexer 820 may multiplex the extended sequences with data symbols, producing a stream of symbols. Filter 825 is configured to filter the stream of symbols, to ensure that the symbols meet spectral requirements, for example. RF circuit 830 is configured to functions to prepare the filtered symbols for transmission, including up-conversion, amplification, and the like.

Figure 11:
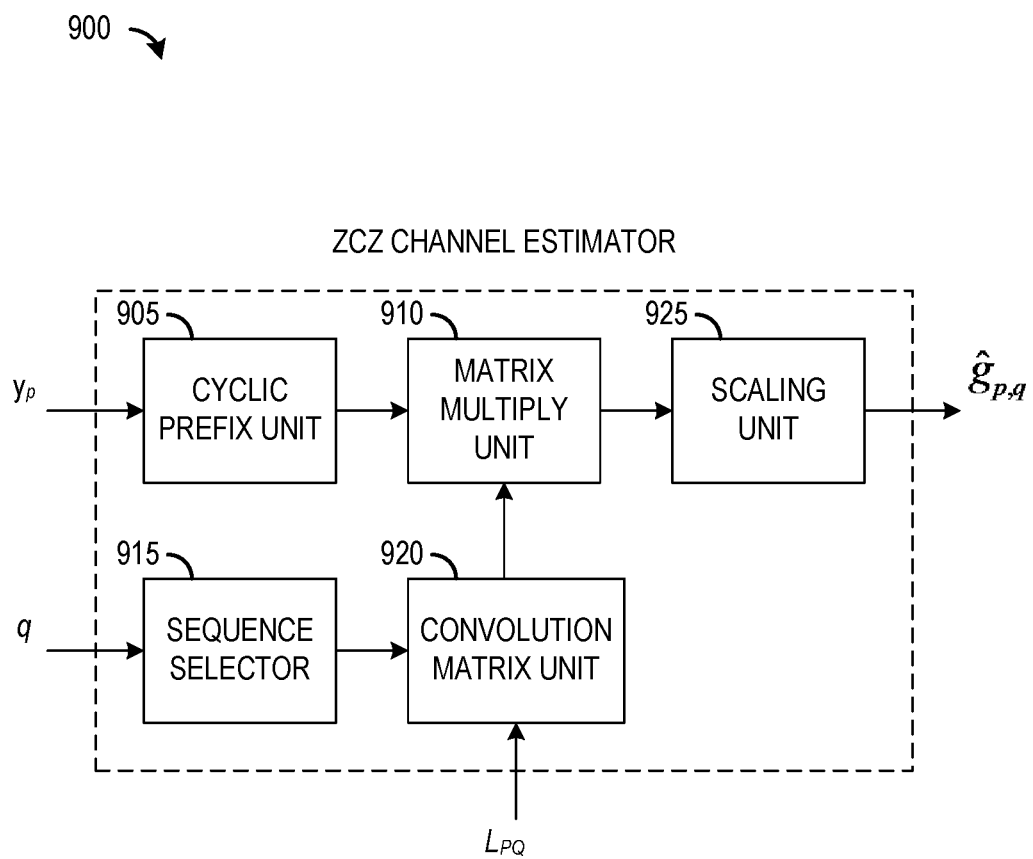
FIG. 11 illustrates an example channel estimator according to example embodiments described herein.

FIG. 11 illustrates an example channel estimator 900. Channel estimator 900 is configured to estimate the channel between the transmit antennas and receive antennas of a full-duplex device utilizing the training signals transmitted using the transmit antennas. Channel estimator 900 includes a cyclic prefix unit 905, a matrix multiply unit 910, a sequence selector 915, a convolution matrix unit 920, and a scaling unit 925. Cyclic prefix unit 905 is configured to remove a cyclic prefix appended to a training sequence as it is transmitted, producing a received training sequence $y_p$. Matrix multiply unit 910 is configured to multiply the received training sequence ($y_p$) with a ZCZ sequence used as the training sequence $X_q$. The ZCZ sequence may be selected in accordance with a value, e.g., an index associated with a transmit antenna, q, provided to sequence selector 915. The selected ZCZ sequence may be used to generate the convolution matrix by convolution matrix unit 920, producing $X_q$. Output of matrix multiply unit 910 may be scaled by scaling unit 925 to produce the channel estimate $\hat{g}_{p,q}$.

Figure 12:
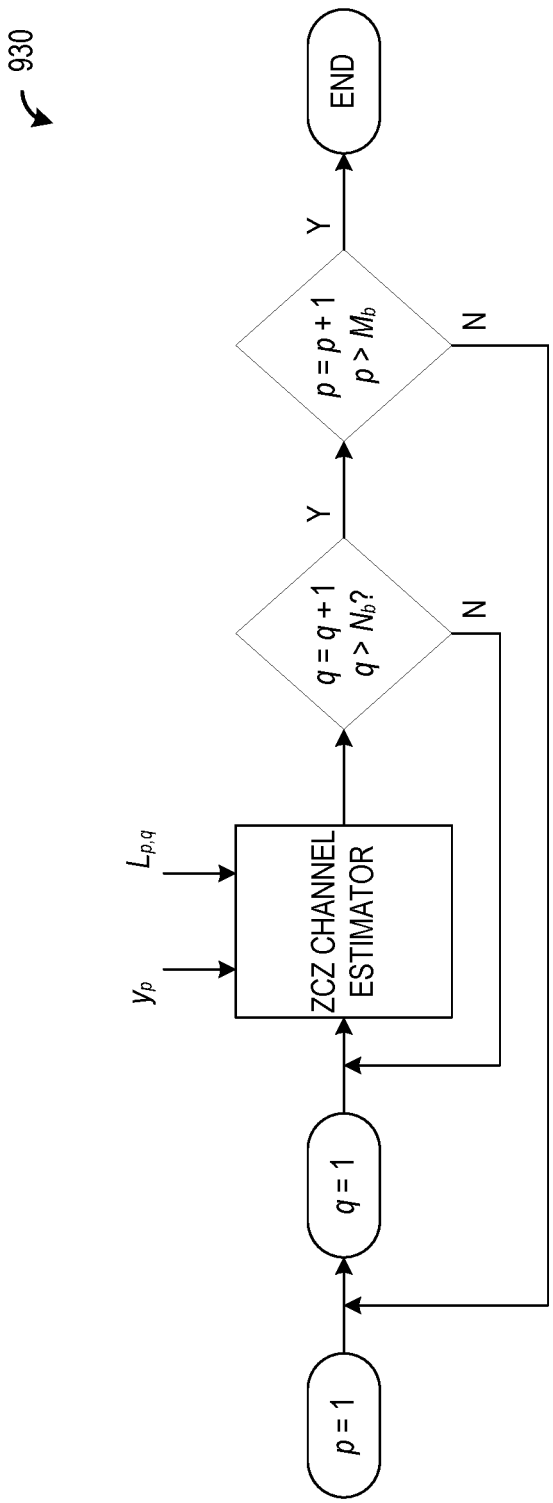
FIG. 12 illustrates a first example MIMO receiver according to example embodiments described herein.
Figure 13:
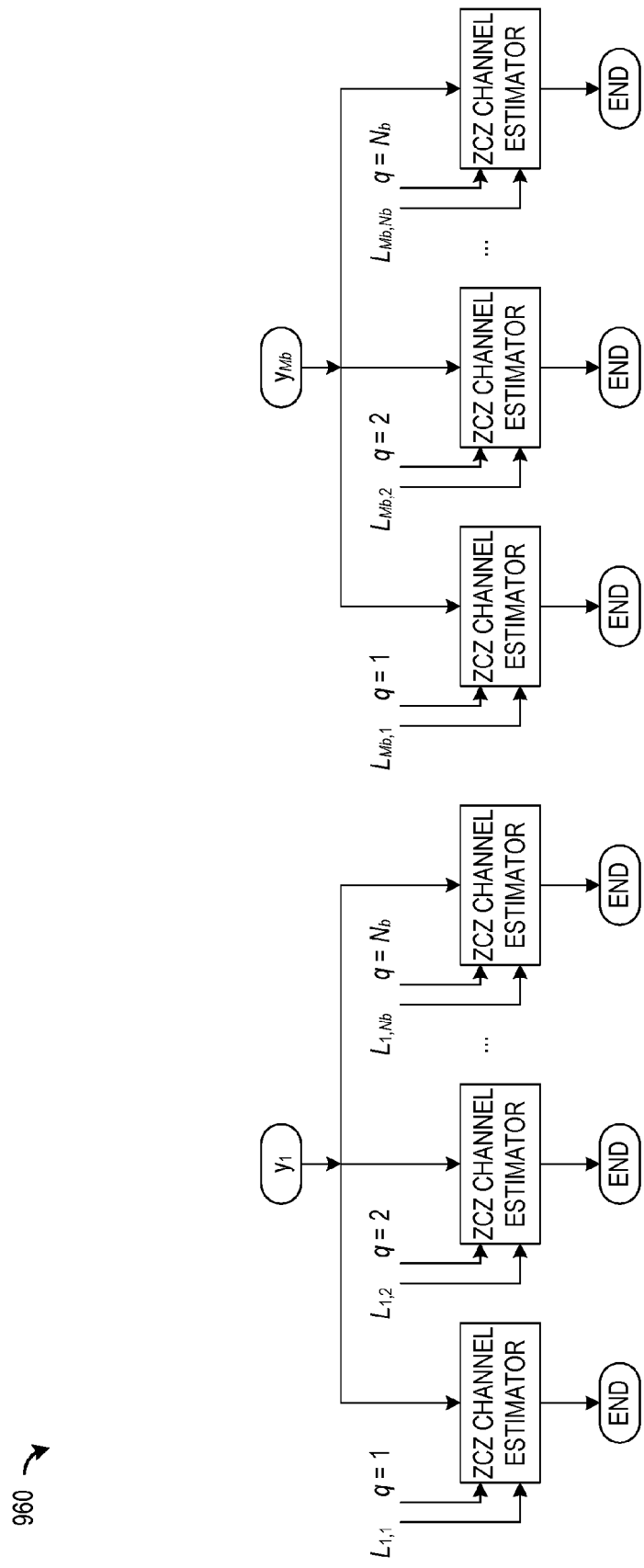
FIG. 13 illustrates a second example MIMO receiver according to example embodiments described herein.

FIG. 12 illustrates a first example MIMO receiver 930. MIMO receiver 930 may be a serial implementation of a MIMO receiver at a receiver of a full-duplex device. FIG. 13 illustrates a second example MIMO receiver 960. MIMO receiver 960 may be a parallel implementation of a MIMO receiver at a receiver of a full-duplex device. It may be possible for the length of individual CIRs of a transmitter-receiver pair to be different, as long as $L_{p,q} \leq L_b$.

Figure 14:
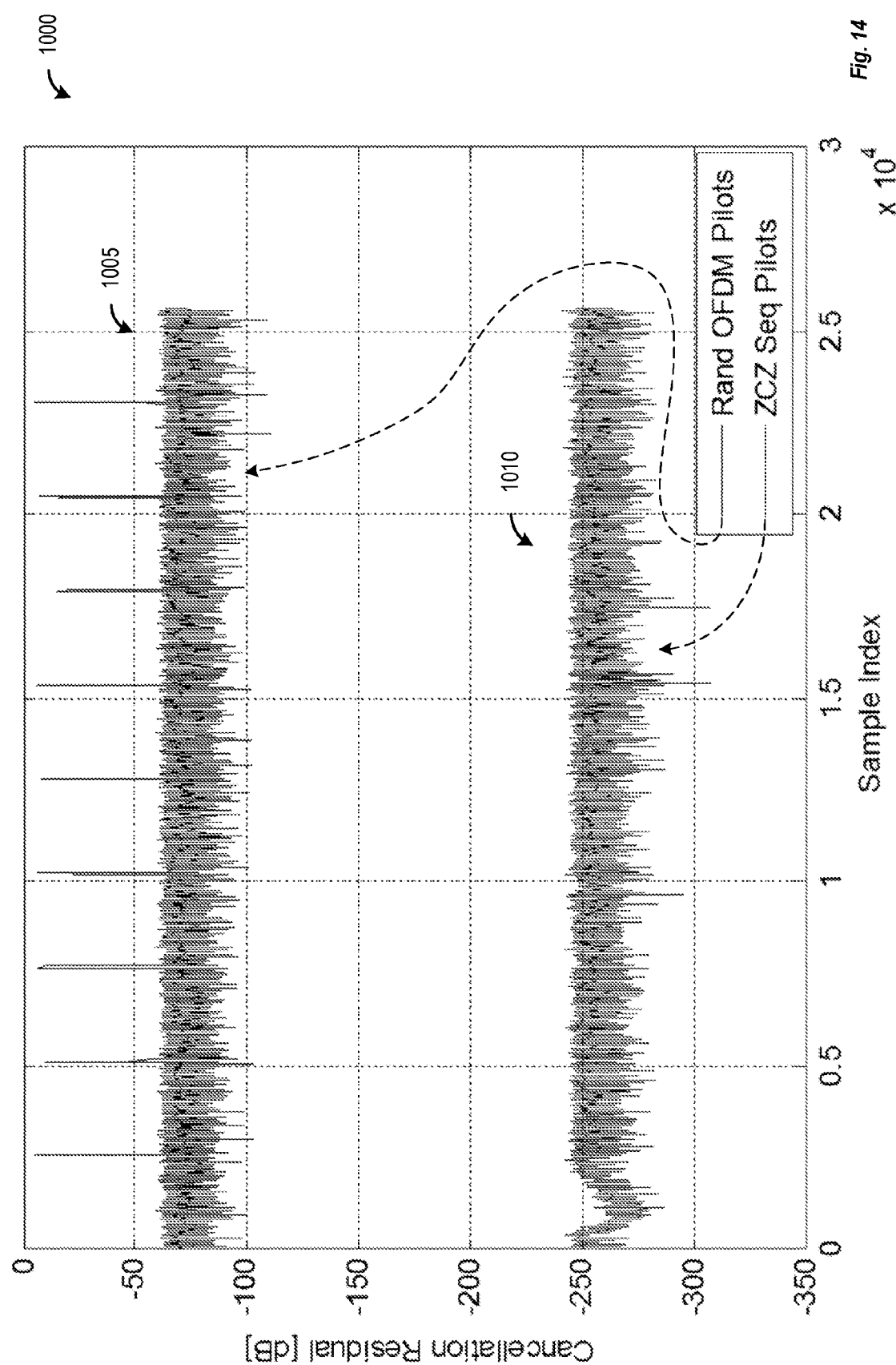
FIG. 14 illustrates a data plot of example cancellation residuals highlighting the difference between random OFDM training signals and training signals based on ZCZ sequences according to example embodiments described herein.

FIG. 14 illustrates a data plot 1000 of example cancellation residuals highlighting the difference between random OFDM training signals and training signals based on ZCZ sequences. As shown in FIG. 14, a first trace 1005 represents cancellation residuals of random OFDM training signals as shown in FIG. 7, and a second trace 1010 represents cancellation residuals of training signals based on ZCZ sequences. The ZCZ sequences used are Zadoff-Chu sequences with system parameters: $N_b=M_b=2$; LTE system BW=20 MHz; N=2048; $N_{cp}=512$ and $L_b=40$. A base Zadoff-Chu sequence is generated with length N and root u=1 (the choice of root of 1 is arbitrary and other roots that are relatively prime to N can also be used). In other words, $$x_1(n) = \begin{cases} e^{j\pi u n^2/N}, & N \text{ is even} \\ e^{j\pi u n(n+1)/N}, & N \text{ is odd} \end{cases}, \quad (23)$$

$$n = 0, 1, \ldots, N-1.$$

The base Zadoff-Chu sequence may be cyclically shifted by a series of $N_{cs}=128$ places to generate a set of 16 ZCZ sequences with a maximum ZCZ zone of $N_{cs}-1$ (127) due to the cyclic shift properties of Zadoff-Chu sequences. The ZCZ zone size $N_{cs}-1$ is chosen such that it is greater than $L_b$ and could handle channels with maximum delay spread of 128 taps. The set can be used in a system with maximum number of 16 transmit antennas. The rest of the ZCZ sequences in the set are expressible as $$x_q(n)=x_1((n+(q-1)128) \bmod N), q=2,3,\ldots,16; n=0, 1,\ldots,N-1. \quad (24)$$

It is noted that the use of the Zadoff-Chu sequences allows for a high degree of flexibility and a large degree of freedom to support a wide range of communications system requirements, i.e., the sequence length, ZCZ zone length, the set size, and the like. Comparing first trace 1005 with second trace 1010, it can be seen that both the channel estimation accuracy and the cancellation performance are improved. Furthermore, the numerical stability is improved.

Figure 15:
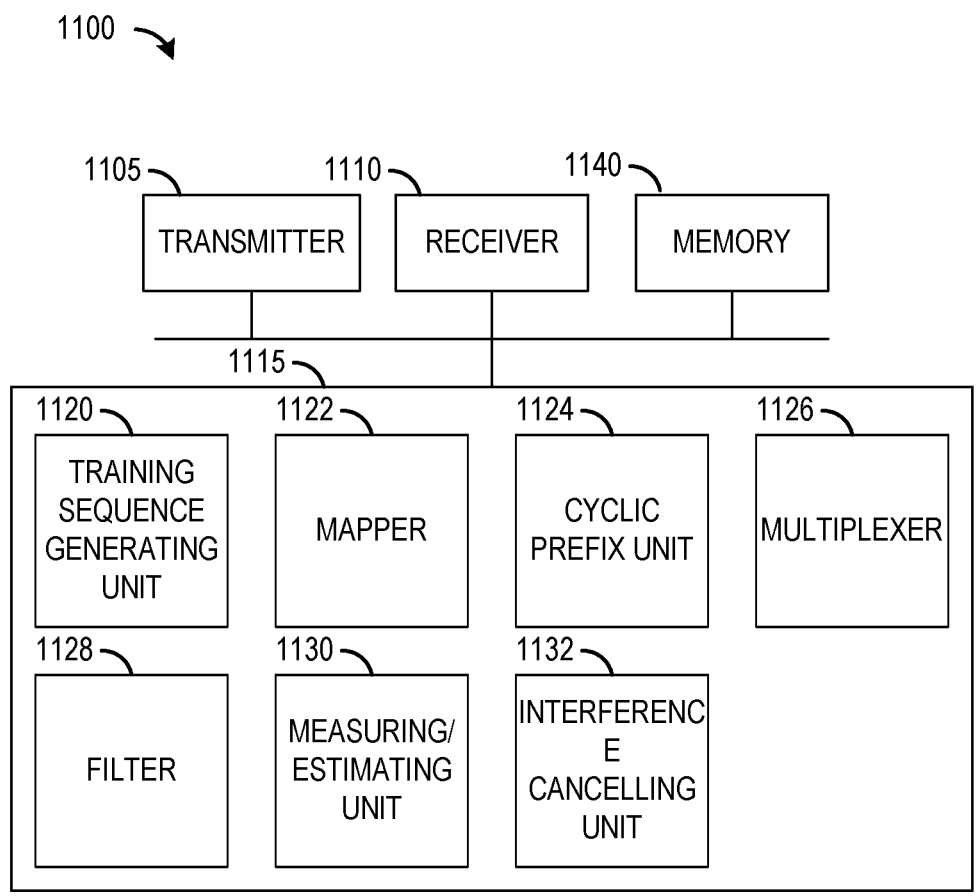
FIG. 15 illustrates an example communications device according to example embodiments described herein.

FIG. 15 illustrates an example communications device 1100. Communications device 1100 may be an implementation of a full-duplex device, such as a full-duplex eNB or a full-duplex UE. Communications device 1100 may be used to implement various ones of the embodiments discussed herein. As shown in FIG. 15, a transmitter 1105 is configured to transmit frames, training signals, and the like. Communications device 1100 also includes a receiver 1110 that is configured to receive frames, training signals, and the like. Other conventional units, such as encoder, decoder, modulator and demodulator used in the transmitter and the receiver, are not shown here for succinctness.

A training sequence generating unit 1120 is configured to generate training sequences used in CIR estimation. Training sequence generating unit 1120 is configured to generate training sequences from ZCZ sequences or any other type of sequences satisfying the condition expressed in Equation (12). Training sequence generating unit 1120 is configured to generate training sequence that meet communications system requirements. A mapper 1122 is configured to map the training sequence to transmit antenna ports. Mapper 1122 is configured to select a training sequence from the training sequences for each transmit antenna. A cyclic prefix unit 1124, if necessary, is configured to add a cyclic prefix to the selected training sequences to produce extended sequences, or to remove the cyclic prefix from the received signals. A multiplexer 1126 is configured to multiplex the extended sequences with data symbols. A filter 1128 is configured to filter the multiplex symbols, to ensure that the symbols meet spectral requirements, for example. A measuring/estimating unit 1130 is configured to measure a channel. Measuring/estimating unit 1130 is configured to measure the channel in accordance with training signals. Measuring/estimating unit1130 is configured to estimate CIR of the channel based on the measurement of the channel. Interference cancelling unit 1132 is configured to cancel interference (self-interference and otherwise) from received signals. Interference cancelling unit 1132 is configured to generate an interference replica from known transmitted data and the estimated CIRs to subtract from the received signal to generate an interference cancelled signal. A memory 1140 is configured to store training sequences, received signals, channel measurements, CIR estimates, interference replicas, interference cancelled signal, and the like.

The elements of communications device 1100 may be implemented as specific hardware logic blocks. In an alternative, the elements of communications device 1100 may be implemented as software executing in a processor, controller, application specific integrated circuit, or so on. In yet another alternative, the elements of communications device 1100 may be implemented as a combination of software and/or hardware.

As an example, receiver 1110 and transmitter 1105 may be implemented as a specific hardware block, while training sequence generating unit 1120, mapper 1122, cyclic prefix unit 1124, multiplexer 1126, filter 1128, measuring/estimating unit 1130, and interference cancelling unit 1132 may be software modules executing in a microprocessor (such as processor 1115) or a custom circuit or a custom compiled logic array of a field programmable logic array. Training sequence generating unit 1120, mapper 1122, cyclic prefix unit 1124, multiplexer 1126, filter 1128, measuring/estimating unit 1130, and interference cancelling unit 1132 may be modules stored in memory 1130.

Although the present disclosure and its advantages have been described in detail, it should be understood that various changes, substitutions and alterations can be made herein without departing from the spirit and scope of the disclosure as defined by the appended claims.

What is claimed is:

1. A method for operating a device configured to operate in a full-duplex mode, the method comprising:
    transmitting, by the device, a training signal derived from a sequence, the training signal configured to facilitate an estimation of a channel impulse response (CIR) for a communications channel between a transmit antenna of the device and a receive antenna of the device;
    estimating, by the device, the CIR for the communications channel;
    receiving, by the device, signals corresponding to a first transmission at the receive antenna;
    cancelling, by the device, self-interference present in the received signals in accordance with the estimated CIR, the self-interference arising from a second transmission made by the transmit antenna of the device, thereby producing an interference canceled received signal; and processing, by the device, the interference canceled received signal, wherein transmitting the training signal comprises generating a plurality of training sequences from a set of sequences in accordance with a communications system requirement, mapping a first training sequence to a transmit antenna, multiplexing the mapped first training sequence with data symbols to produce a transmission stream, and transmitting the transmission stream as the training signal.

2. The method of claim 1, wherein the sequence has a correlation matrix that is a scaled identity matrix.

3. The method of claim 1, wherein the plurality of training sequences comprises a zero-correlation-zone (ZCZ) sequence.

4. The method of claim 1, wherein the communications system requirement comprises at least one of: a length of a training sequence is equal to a desired symbol length N before a cyclic prefix is added, wherein N is an integer value; a size of e the plurality of training sequences is at least equal to a number of transmit antennas of the device $N_b$; and a sequence zone length of the plurality of training sequences is at least equal to a channel delay spread $L_b$ which dictates a minimum ZCZ zone length for auto-correlations and cross-correlations of the plurality of training sequences.

5. The method of claim 1, wherein the plurality of training sequences are derived from Zadoff-Chu sequences.

6. The method of claim 1, wherein the training signal is transmitted while the device is operating in a half-duplex mode.

7. The method of claim 1, wherein the training signal is transmitted in a special subframe comprising a downlink portion, a training portion, and an uplink portion.

8. The method of claim 7, wherein the training signal is transmitted in the training portion of the special subframe.

9. The method of claim 7, wherein the training signal is transmitted in the downlink portion and the training portion of the special subframe.

10. The method of claim 1, wherein each sequence in the set of sequences has a correlation matrix that is a scaled identity matrix.

11. The method of claim 1, wherein transmitting the transmission stream further comprises filtering the transmission stream.

12. The method of claim 1, further comprising appending a cyclic prefix to the mapped first training sequence prior to multiplexing.

13. A device configured for full-duplex operation comprises:
a transmitter configured to transmit a training signal derived from a sequence, the training signal configured to facilitate an estimation of a channel impulse response (CIR) for a communications channel between a transmit antenna of the device and a receive antenna of the device;
a processor operatively coupled to the transmitter, the processor configured to estimate the CIR for the communications channel, cancel a self-interference present in received signals in accordance with the estimated CIR, the received signals corresponding to a first transmission at the receive antenna, and the self-interference arising from a second transmission made by the transmit antenna of the device, thereby producing an interference canceled received signal, and process the interference canceled received signal; and a receiver operatively coupled to the processor, the receiver configured to receive the received signals; and
wherein transmit the training signal comprises generating a plurality of training sequences from a set of sequences in accordance with a communications system requirement, mapping a first training sequence to the transmit antenna, multiplexing the mapped first training sequence with data symbols to produce a transmission stream, and transmitting the transmission stream as the training signal.

14. The device of claim 13, wherein the plurality of training sequences comprises a zero-correlation-zone (ZCZ) sequence.

15. The device of claim 13, wherein the transmitter is configured to transmit the training signal in a half-duplex mode.

16. The device of claim 13, wherein the transmitter is configured to transmit the training signal in a training portion of a special subframe.

17. The device of claim 16, wherein the transmitter is configured to transmit the training signal in a downlink portion of the special subframe.

18. The device of claim 13, wherein the device comprises an evolved NodeB.

19. A method, comprising:
transmitting, a zero-correlation-zone (ZCZ) sequence selected from a set of ZCZ sequences over a transmit antenna of a device, the device configured to operate in a full-duplex mode;
receiving the ZCZ sequence over a receive antenna of the device;
estimating a channel impulse response (CIR) for a communications channel between the transmit antenna and the receive antenna according to the ZCZ sequence;
transmitting a first signal over the transmit antenna of the device;
receiving a second signal over the receive antenna of the device, the first signal and the second signal being full-duplexed signals and the second signal comprises a self-interference component attributable to the first signal; and
cancelling, by the device, the self-interference component from the second signal in accordance with the estimated CIR.

20. The method of claim 19, wherein the set of ZCZ sequences has a correlation matrix that is a scaled identity matrix.

21. The method of claim 19, wherein the set of ZCZ sequences is derived from a Zadoff-Chu sequence.

22. The method of claim 19, wherein each ZCZ sequence in the set of ZCZ sequences has a length that is equal to a pre-defined symbol length without a cyclic prefix added.

23. The method of claim 19, wherein the transmit antenna of the device comprises multiple antenna elements, wherein a number of ZCZ sequences in the set of ZCZ sequences is equal to or greater than a number of the multiple antenna elements in the transmit antenna of the device.

24. The method of claim 19, wherein the set of ZCZ sequences has a ZCZ zone length that is equal to or greater than a predefined threshold for auto-correlations and cross-correlations of the set of ZCZ sequences.

25. The method of claim 19, wherein the ZCZ sequence is transmitted when the device is operating in a half-duplex mode.

26. The method of claim 19, further comprising mapping the ZCZ sequence to the transmit antenna of the device before transmitting the ZCZ sequence.

27. The method of claim 19, wherein transmitting the ZCZ sequence comprises:
- multiplexing the ZCZ sequence with data symbols to produce a transmission stream; and
- transmitting the transmission stream over the transmit antenna.

\* \* \* \* \*